US008521998B2

(12) United States Patent
Abernathy et al.

(10) Patent No.: US 8,521,998 B2
(45) Date of Patent: Aug. 27, 2013

(54) INSTRUCTION TRACKING SYSTEM FOR PROCESSORS

(75) Inventors: Christopher Michael Abernathy, Austin, TX (US); Hung Qui Le, Austin, TX (US); Dung Quoc Nguyen, Austin, TX (US); Benjamin Walter Stolt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/793,718

(22) Filed: Jun. 4, 2010

(65) Prior Publication Data

US 2011/0302392 A1 Dec. 8, 2011

(51) Int. Cl.
*G06F 9/30* (2006.01)

(52) U.S. Cl.
USPC .......................................................... 712/235

(58) Field of Classification Search
None
See application file for complete search history.

(56) References Cited

U.S. PATENT DOCUMENTS

| 6,553,480 | B1 * | 4/2003 | Cheong et al. ................... 712/23 |
| 6,721,874 | B1 * | 4/2004 | Le et al. ......................... 712/218 |
| 7,278,011 | B2 | 10/2007 | Eisen et al. |
| 7,472,258 | B2 * | 12/2008 | Burky et al. ................... 712/218 |

* cited by examiner

*Primary Examiner* — Andrew Caldwell
*Assistant Examiner* — Benjamin Geib
(74) *Attorney, Agent, or Firm* — Yee & Associates, P.C.; Libby Z. Toub

(57) ABSTRACT

A method and apparatus for tracking instructions in a processor. A completion unit in the processor receives an instruction group to add to a table to form a received instruction group. In response to receiving the received instruction group, the completion unit determines whether an entry is present that contains a previously stored instruction group in a first location and has space for storing the received instruction group. In response to the entry being present, the completion unit stores the received instruction group in a second location in the entry to form a stored instruction group.

22 Claims, 9 Drawing Sheets

FIG. 6

TABLE INFORMATION

602 — LIST OF THREADS (612)

| THREAD IDENTIFIER 610 | FIRST INSTRUCTION GROUP | LAST INSTRUCTION GROUP 614 |
|---|---|---|
| 616 — THREAD 1 | 1,1 | 6,1 |

604 — LIST OF INSTRUCTION GROUPS

| TABLE LOCATION 620 | THREAD IDENTIFIER 622 | EFFECTIVE ADDRESS 624 | NUMBER OF INSTRUCTIONS 626 | FLUSHABLE INDICATOR 628 | NEXT INSTRUCTION GROUP 630 | PREVIOUS INSTRUCTION GROUP 632 |
|---|---|---|---|---|---|---|
| 634 — 1,1 | THREAD 1 | 0xfff41100 | 6 | FALSE | 2,1 | 0,0 |
| 636 — 2,1 | THREAD 1 | 0xfff41200 | 4 | TRUE | 2,2 | 1,1 |
| 638 — 2,2 | THREAD 1 | 0xfff41300 | 4 | TRUE | 3,1 | 2,1 |
| 640 — 3,1 | THREAD 1 | 0xfff41400 | 4 | TRUE | 3,2 | 2,2 |
| 642 — 3,2 | THREAD 1 | 0xfff41500 | 4 | TRUE | 4,1 | 3,1 |
| 644 — 4,1 | THREAD 1 | 0xfff41600 | 2 | TRUE | 5,1 | 3,2 |
| 646 — 5,1 | THREAD 1 | 0xfff41700 | 8 | TRUE | 6,1 | 4,1 |
| 648 — 6,1 | THREAD 1 | 0xfff41800 | 6 | TRUE | 0,0 | 5,1 |

606 — LIST OF INSTRUCTION ARRAYS

- 650 — [1,1,0,0,0,0,0,0]
- 652 — [0,0,0,0,0,0,0,0]
- 654 — [0,0,0,0,0,0,0,0]
- 656 — [0,0,0,0,0,0,0,0]
- 658 — [0,0,0,0,0,0,0,0]
- 660 — [0,0,0,0,0,0,0,0]
- 662 — [0,0,0,0,0,0,0,0]
- 664 — [0,0,0,0,0,0,0,0]

INSTRUCTION TRACKING SYSTEM FOR PROCESSORS

BACKGROUND

1. Field

The present disclosure relates generally to an improved data processing system and, more particularly, to a method and apparatus for tracking instructions. Still more particularly, the present disclosure relates to a method and apparatus for tracking instructions dispatched for processing in a processor.

2. Description of the Related Art

A processor in a computer is the part of the computer that processes instructions in a program. In processing instructions, the instructions may be sent by a dispatching unit in the processor to various functional units for processing. These units may perform different operations using the instructions.

Additionally, a processor may retrieve instructions for different paths. For example, with a branch instruction, a subsequent group of instructions is processed if a branch is not taken. A different group of instructions starting at a target address is processed if the branch is taken. Instructions for both groups may be fetched by a sequencer so that those groups of instructions are ready for processing.

With respect to processing, both groups of instructions may be processed. With this situation, some results may not be needed and may be discarded. Additionally, if instructions for two different paths are fetched for processing, one of those paths may be taken before all of instructions in both paths are processed. As a result, instructions that have not yet been processed in the path not taken may be flushed or removed. These instructions are tracked in a data structure used by a completion unit within the processor. This data structure often takes the form of a global completion table. The global completion table obtains entries in which each entry tracks a group of instructions. A group of instructions is one or more instructions that have been fetched as a group.

SUMMARY

In the illustrative embodiment, a method and apparatus are provided for tracking instructions in a processor. A completion unit in the processor receives an instruction group to add to a table to form a received instruction group. In response to receiving the received instruction group, the completion unit determines whether an entry is present that contains a previously stored instruction group in a first location and has space for storing the received instruction group. In response to the entry being present, the completion unit stores the received instruction group in a second location in the entry to form a stored instruction group.

BRIEF DESCRIPTION OF THE SEVERAL VIEWS OF THE DRAWINGS

FIG. 6 is an illustration of table information in accordance with an illustrative embodiment;

DETAILED DESCRIPTION

Figure 1:
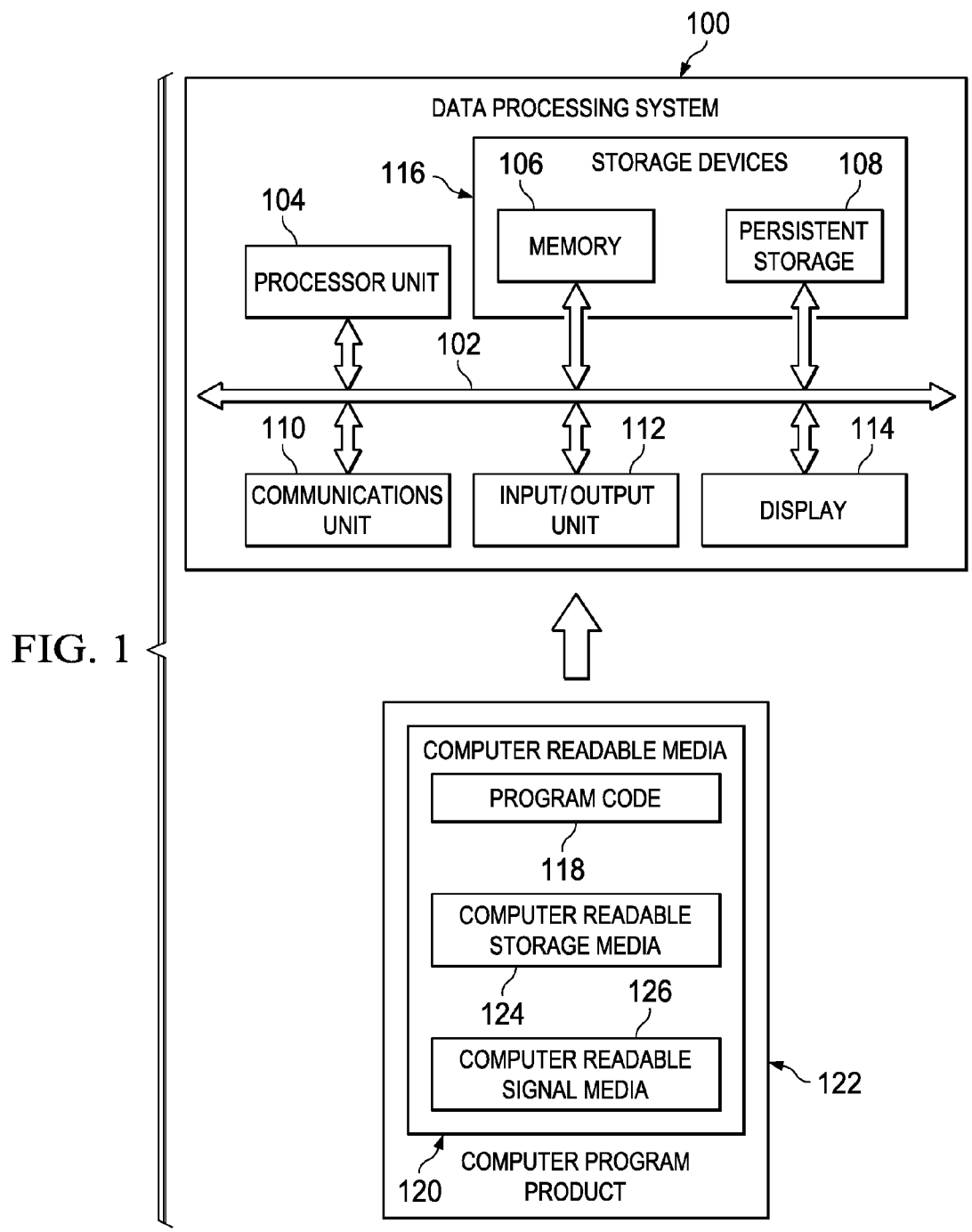
FIG. 1 is an illustration of a data processing system in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction processing system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for processing by processor unit 104. The processes of the different embodiments may be performed by processor unit 104 using computer implemented instructions, which may be located in a memory, such as memory 106.

These instructions are referred to as program code, computer usable program code, or computer readable program code that may be read and processed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for processing by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
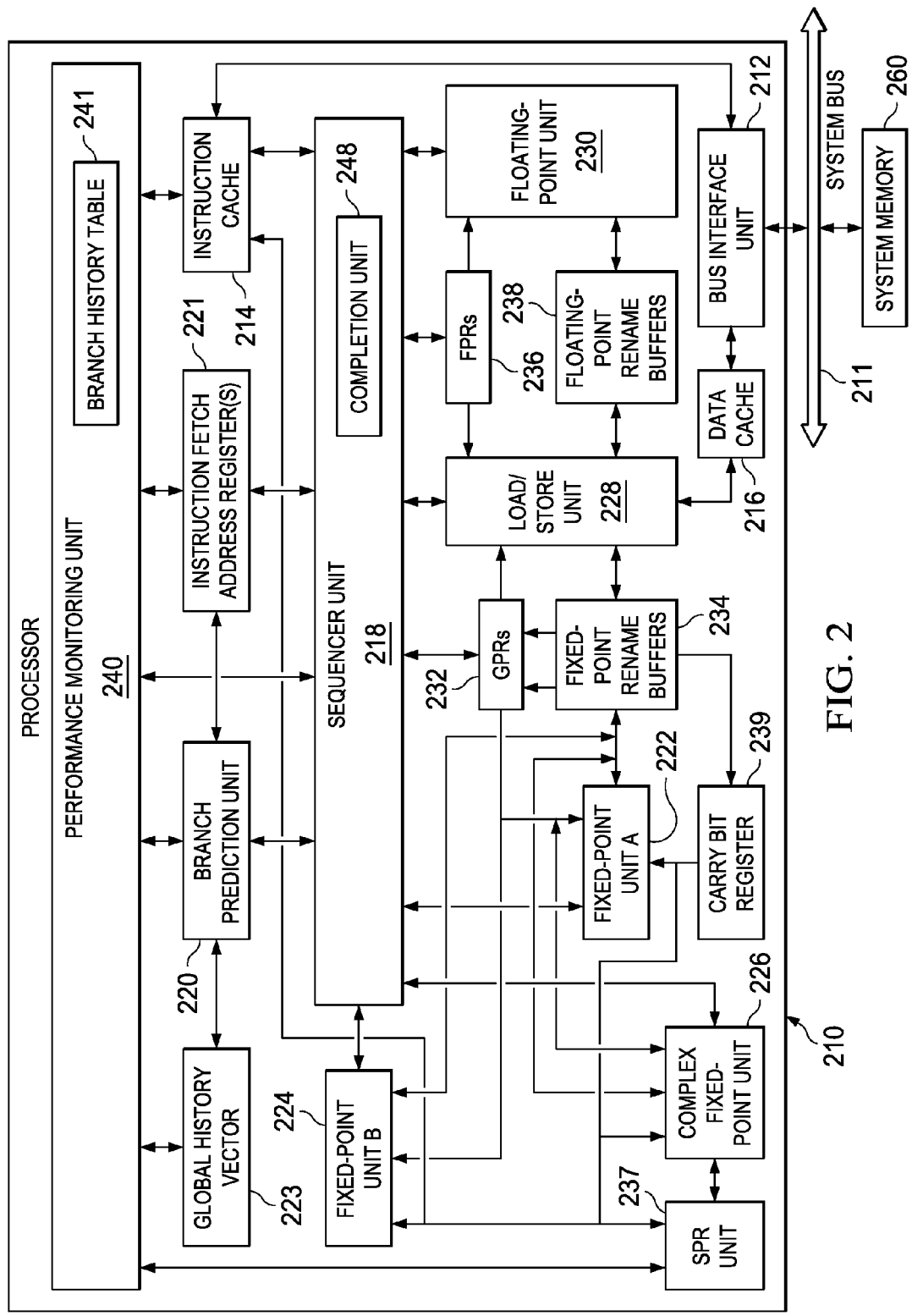
FIG. 2 is an illustration of a processor in accordance with an illustrative embodiment.

With reference now to FIG. 2, an illustration of a processor is depicted in accordance with an illustrative embodiment. Processor 210 is an example of a processor that may be found in processor unit 104 in FIG. 1. One or more of processor 210 may be used in processor unit 104 in FIG. 1.

In an illustrative embodiment, processor 210 is an integrated circuit superscalar microprocessor. Processor 210 includes various units and different types of memory. The different types of memory may include at least one of a register, a buffer, and some other suitable type of memory. These components in processor 210 are implemented as integrated circuits. In addition, in the illustrative embodiment, processor 210 operates using reduced instruction set computer (RISC) techniques.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

System bus 211 connects to bus interface unit (BIU) 212 of processor 210. Bus interface unit 212 controls the transfer of information between processor 210 and system bus 211. Bus interface unit 212 connects to instruction cache 214 and to data cache 216 of processor 210. Instruction cache 214 outputs instructions to sequencer unit 218. In response to such instructions from instruction cache 214, sequencer unit 218 selectively outputs instructions to other circuitry in processor 210.

Processor 210 supports the processing of different types of instructions. Some instructions have a set of source operands that describe data used by the instructions. Source operands can be data or an indication of where the data is located. The data may be located in memory in processor 210. Additionally, some instructions have destination operands that describe where results of the instructions should be placed. Destination operands cause elements of processor 210 to place the result of the instruction in memory in processor 210.

The following example instruction has two source operands and a destination operand "fadd source operand a, source operand b, destination operand c." In this example, fadd stands for floating-point addition operator. During processing of the example fadd instruction, elements of processor 210 will process the fadd instruction by adding the value from source operand a to the value from source operand b and placing the result value into destination operand c.

In addition to sequencer unit 218, processor 210 includes multiple units. These units include, for example, branch prediction unit 220, fixed-point unit A (FXUA) 222, fixed-point unit B (FXUB) 224, complex fixed-point unit (CFXU) 226, load/store unit (LSU) 228, and floating-point unit (FPU) 230. Fixed-point unit A 222, fixed-point unit B 224, complex fixed-point unit 226, and load/store unit 228 input their source operand information from general-purpose architectural registers (GPRs) 232 and fixed-point rename buffers (PFRs) 234.

Moreover, fixed-point unit A 222 and fixed-point unit B 224 input a "carry bit" from carry bit (CA) register 239. Fixed-point unit A 222, fixed-point unit B 224, complex fixed-point unit 226, and load/store unit 228 output results of their operations for storage at selected entries in fixed-point rename buffers 234. These results are destination operand information. In addition, complex fixed-point unit 226 inputs and outputs source operand information and destination operand information to and from special-purpose register processing (SPR) unit 237.

Floating-point unit 230 inputs its source operand information from floating-point architectural registers (FPRs) 236 and floating-point rename buffers 238. Floating-point unit 230 outputs results of its operation for storage at selected entries in floating-point rename buffers 238. In these examples, the results are destination operand information.

In response to a load instruction, load/store unit 228 inputs information from data cache 216 and copies such information to selected ones of fixed-point rename buffers 234 and floating-point rename buffer 238. If such information is not stored in data cache 216, then data cache 216 inputs through bus interface unit 212 and system bus 211 the information from system memory 260 connected to system bus 211. Moreover, data cache 216 is able to output through bus interface unit 212 and system bus 211 information from data cache 216 to system memory 260 connected to system bus 211. In response to a store instruction, load/store unit 228 inputs information from a selected one of general-purpose architectural registers (GPRs) 232 and fixed-point rename buffers 234 and copies such information to data cache 216.

Sequencer unit 218 inputs and outputs information to and from general-purpose architectural registers (GPRs) 232 and fixed-point rename buffers 234. From sequencer unit 218, branch prediction unit 220 inputs instructions and signals indicating a present state of processor 210. In response to such instructions and signals, branch prediction unit 220 outputs to sequencer unit 218 and instruction fetch address register(s) (IFAR) 221 signals indicating suitable memory addresses storing a sequence of instructions for processing by processor 210.

In response to such signals from branch prediction unit 220, sequencer unit 218 fetches the indicated sequence of instructions from instruction cache 214. If one or more of the sequence of instructions is not stored in instruction cache 214, then instruction cache 214 inputs through bus interface unit 212 and system bus 211 such instructions from system memory 260 connected to system bus 211.

In response to the instructions input from instruction cache 214, sequencer unit 218 selectively dispatches the instructions to selected ones of branch prediction unit 220, fixed-point unit A 222, fixed-point unit B 224, complex fixed-point unit 226, load/store unit 228, and floating-point unit 230. Each unit processes one or more instructions of a particular class of instructions. For example, fixed-point unit A 222 and fixed-point unit B 224 perform a first class of fixed-point mathematical operations on source operands, such as addition, subtraction, ANDing, ORing and XORing. Complex fixed-point unit 226 performs a second class of fixed-point operations on source operands, such as fixed-point multiplication and division. Floating-point unit 230 performs floating-point operations on source operands, such as floating-point multiplication and division.

Information stored at a selected one of fixed-point rename buffers 234 is associated with a storage location. An example of a storage location may be, for example, one of general-purpose architectural registers (GPRs) 232 or carry bit (CA) register 239. The instruction specifies the storage location for which the selected rename buffer is allocated. Information stored at a selected one of fixed-point rename buffers 234 is copied to its associated one of general-purpose architectural registers (GPRs) 232 or carry bit register 239 in response to signals from sequencer unit 218. Sequencer unit 218 directs such copying of information stored at a selected one of fixed-point rename buffers 234 in response to "completing" the instruction that generated the information. Such copying is referred to as a "writeback."

As information is stored at a selected one of floating-point rename buffers 238, such information is associated with one of fixed-point rename buffers 234. Information stored at a selected one of floating-point rename buffers 238 is copied to its associated one of fixed-point rename buffers 234 in response to signals from sequencer unit 218. Sequencer unit 218 directs such copying of information stored at a selected one of floating-point rename buffers 238 in response to "completing" the instruction that generated the information.

Completion unit 248 in sequencer unit 218 tracks the completion of the multiple instructions. These instructions are instructions being processed within the units. When an instruction or a group of instructions have been completed successfully, in an sequential order specified by an application, completion unit 248 may be utilized by sequencer unit 218 to cause the transfer of the results of those completed instructions to the associated general-purpose registers. Completion unit 248 is located in memory in processor 210 in this illustrative example. In other illustrative examples, processor 210 may include hardware components that form completion unit 248.

A number of the different illustrative embodiments may be implemented within completion unit 248 in these examples. Completion unit 248 may include logic or other functions to track the completion of instructions in accordance with an illustrative embodiment.

Global history vector (GHV) 223 is connected to branch prediction unit 220 and performance monitoring unit 240. Global history vector 223 stores recent paths of instruction processing by processor 210. Global history vector 223 is stored in memory in processor 210.

Branch prediction unit 220 predicts whether a branch based on the path of processing. This path may be identified by the history of the last few branches to have been processes.

Branch prediction unit 220 stores a bit-vector, referred to as a "global history vector," that represents the recent path of processing. Global history vector 223 stores bits of data. Each bit of data is associated with the instructions. The position of a bit in global history vector 223 indicates how recently the associated instructions were fetched. For example, bit-0 in global history vector 223 may represent the most recent fetch and bit-n may represent n fetches ago. If the instructions fetched contained a branch instruction whose branch was taken, then a "1" may be indicated in global history vector 223 corresponding to that instruction. Otherwise, a "0" may be indicated in global history vector 223.

Upon each successive fetch of instructions, global history vector 223 is updated by shifting in appropriate "1"s and "0"s and discarding the oldest bits. The resulting data in global history vector 223 when exclusive ORed with instruction fetch address register(s) 221 selects the branch instruction in branch history table 241 that was taken or not taken as indicated by the bit in global history vector 223.

Additionally, processor 210 includes performance monitoring unit 240 in these illustrative examples. Performance monitoring unit 240 is an example of hardware in which different illustrative embodiments may be implemented. As depicted, performance monitoring unit 240 connects to instruction cache 214, instruction fetch address register(s) 221, branch prediction unit 220, global history vector 223, and special-purpose register processing (SPR) unit 237.

Performance monitoring unit 240 receives signals from other functional units and initiates actions. In these examples, performance monitoring unit 240 obtains information about instructions. Performance monitoring unit 240 includes branch history table 241.

Branch history table 241 is stored in memory in processor 210. Branch history table 241 stores branch predictions made by branch prediction unit 220. Further, branch history table 241 also stores information generated during the processing of instructions. For example, branch history table 241 may store addresses for each branch instruction processed.

The different components illustrated for processor 210 are not meant to provide architectural limitations to the manner in which different embodiments may be implemented. The different illustrative embodiments may be implemented in a processor unit including components in addition to or in place of those illustrated for processor 210. Other components shown in FIG. 2 can be varied from the illustrative examples shown.

The different illustrative embodiments recognize and take into account that it is important to efficiently use storage space in a processor. With respect to the use of storage space in a processor, the different illustrative embodiments recognize and take into account that current processor architectures store instructions in a completion table. This completion table contains entries for instruction groups. The different illustrative embodiments recognize and take into account that one instruction group is placed into each entry in a completion table.

The different illustrative embodiments also recognize and take into account that this type of management of a completion table may be inefficient. For example, the different illustrative embodiments recognize and take into account that if the number of instructions in a group of instructions does not fill up the entire entry, unused space remains within the completion table. For example, if every group that has been retrieved has one instruction, the completion table may be mostly unused. The different illustrative embodiments, however, recognize and take into account that with this situation, the completion table is full but has large amounts of unused space.

Thus, the different illustrative embodiments provide a method and apparatus for tracking instructions. In particular, the different illustrative embodiments provide a method and apparatus for tracking the completion of instructions using a table in a processor. In response to receiving, by a completion unit in a processor, an instruction group for tracking, a first location in an entry in a table restoring instruction groups is identified.

The completion unit stores the instruction group in the first location in the entry in the table identified for the instruction group to form a stored instruction group. The completion unit associates a first set of pointers with the stored instruction group. The first set of pointers point to a previously stored instruction group in a second location in a second entry in the table. The previously stored instruction group is part of a same thread as the stored instruction group and is prior to the stored instruction group in an order of instructions for processing with the thread. The completion unit associates a second set of pointers with the prior instruction group. The second set of pointers point to the first location in the first entry for the stored instruction group.

Figure 3:
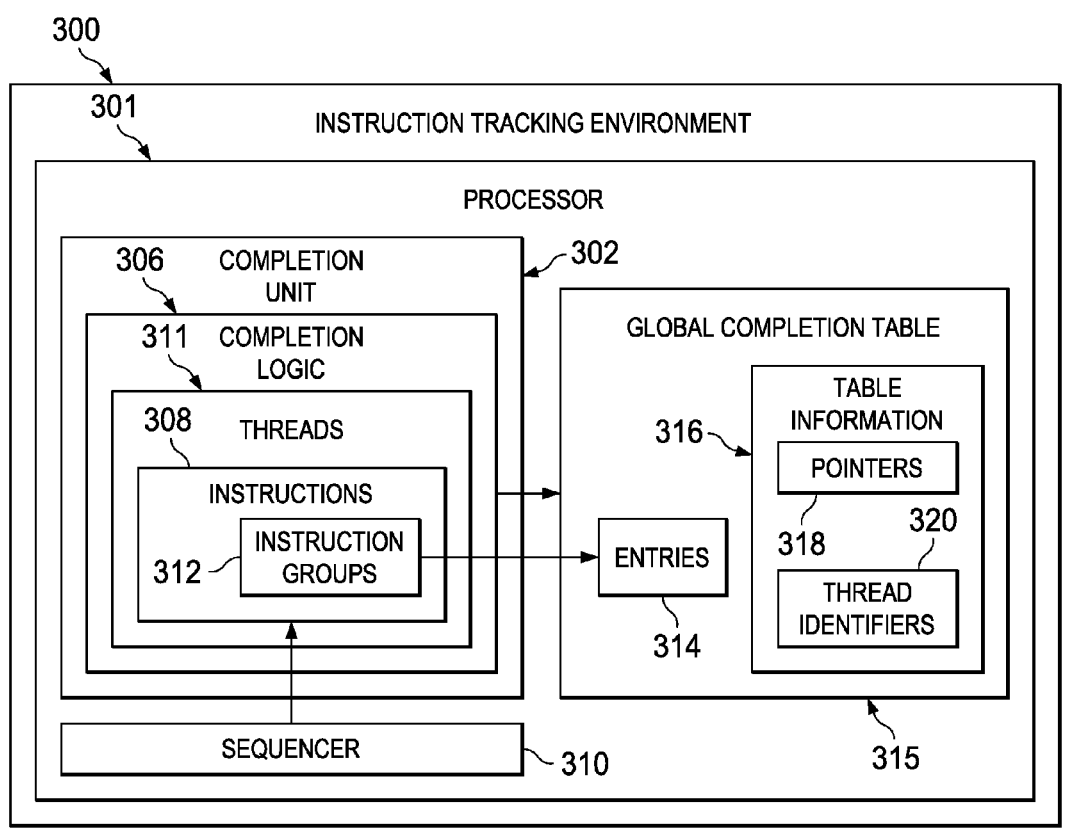
FIG. 3 is an illustration of an instruction tracking environment in accordance with an illustrative embodiment.

With reference now to FIG. 3, an illustration of an instruction tracking environment is depicted in accordance with an illustrative embodiment. Instruction tracking environment 300 is an example of an environment that may be implemented to process instructions in data processing system 100 in FIG. 1. Instruction tracking environment 300 includes processor 301. Processor 301 is an example implementation for processor 210 in FIG. 2 and/or data processing system 100 in FIG. 1.

In this illustrative example, processor 301 includes completion unit 302 and sequencer 310. Completion unit 302 is an example of one implementation for completion unit 248 in FIG. 2. In this example, completion logic 306 receives instructions 308 from sequencer 310. Sequencer 310 is an example of one implementation for sequencer unit 218 in FIG. 2.

Instructions 308 are received from sequencer 310 by completion logic 306 in the form of instruction groups 312. An instruction group in instruction groups 312 contains a set of instructions. A set, as used herein, when referring to items, means one of more items. For example, a set of instructions is one or more instructions.

Each instruction group in instruction groups 312 is associated with a thread in threads 311. A thread in threads 311 may include a set of instruction groups in instruction groups 312. Sequencer 310 identifies threads 311 for instruction groups 312 when sending instruction groups 312 to completion logic 306 in these illustrative examples.

Each time an instruction group in instruction groups 312 is received from sequencer 310, completion logic 306 places the instruction group into an entry within entries 314 in global completion table 315. In these examples, placing an instruction group into an entry may include storing a set of addresses for the set of instructions within the instruction group in the entry, storing information about the set of instructions within the instruction group in the entry, storing the actual set of instructions, or some combination thereof.

In these illustrative examples, completion logic 306 may place more than one instruction group into an entry. The number of instruction groups that may be placed into an entry depends on the amount of space needed by the instruction groups and the amount of space available in the entry. The amount of space needed by the instruction groups may be determined by the number of instructions in an instruction group. Additionally, an entry in entries 314 may be able to hold a selected number of instructions. As a result, an entry may have one instruction group, two instruction groups, or some other number of instruction groups.

In these illustrative examples, global completion table 315 also includes table information 316. Table information 316 provides information about the location of instruction groups 312 in entries 314 within global completion table 315. Additionally, table information 316 also may include pointers 318 and thread identifiers 320. Pointers 318 are used to associate instruction groups within instruction groups 312 that are in sequence with each other. Thread identifiers 320 are used to identify instruction groups that are related to each other. In other words, if two instruction groups have the same thread identifier, those two instruction groups are related to each other with respect to a thread of processing.

In these illustrative examples, instruction groups with the same thread identifier may be associated with each other using pointers 318 such that one instruction group points to a prior instruction group in the sequence of instructions. The sequence of instructions, in these examples, is identified based on when instruction groups 312 are fetched by sequencer 310 from an instruction cache and given to completion unit 302 for tracking. The instruction cache may be, for example, instruction cache 214 in FIG. 2.

As a result, instruction groups within instruction groups 312 that have the same thread identifier may be associated with each other in a sequence in which the instruction groups are retrieved for placement in global completion table 315. Additionally, instructions within instruction groups 312 also have a sequence. This sequence is a sequence in which the instructions are retrieved and placed into a group by sequencer 310.

The illustration of instruction tracking environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, multiple threads in threads 311 may be processed by completion logic 306 at the same time. Additionally, in some illustrative embodiments, an entry in entries 314 may store instruction groups for different threads. Further, in other illustrative embodiments, additional tables in addition to global completion table 315 may be present when processing a selected number of threads at the same time.

Figure 4:
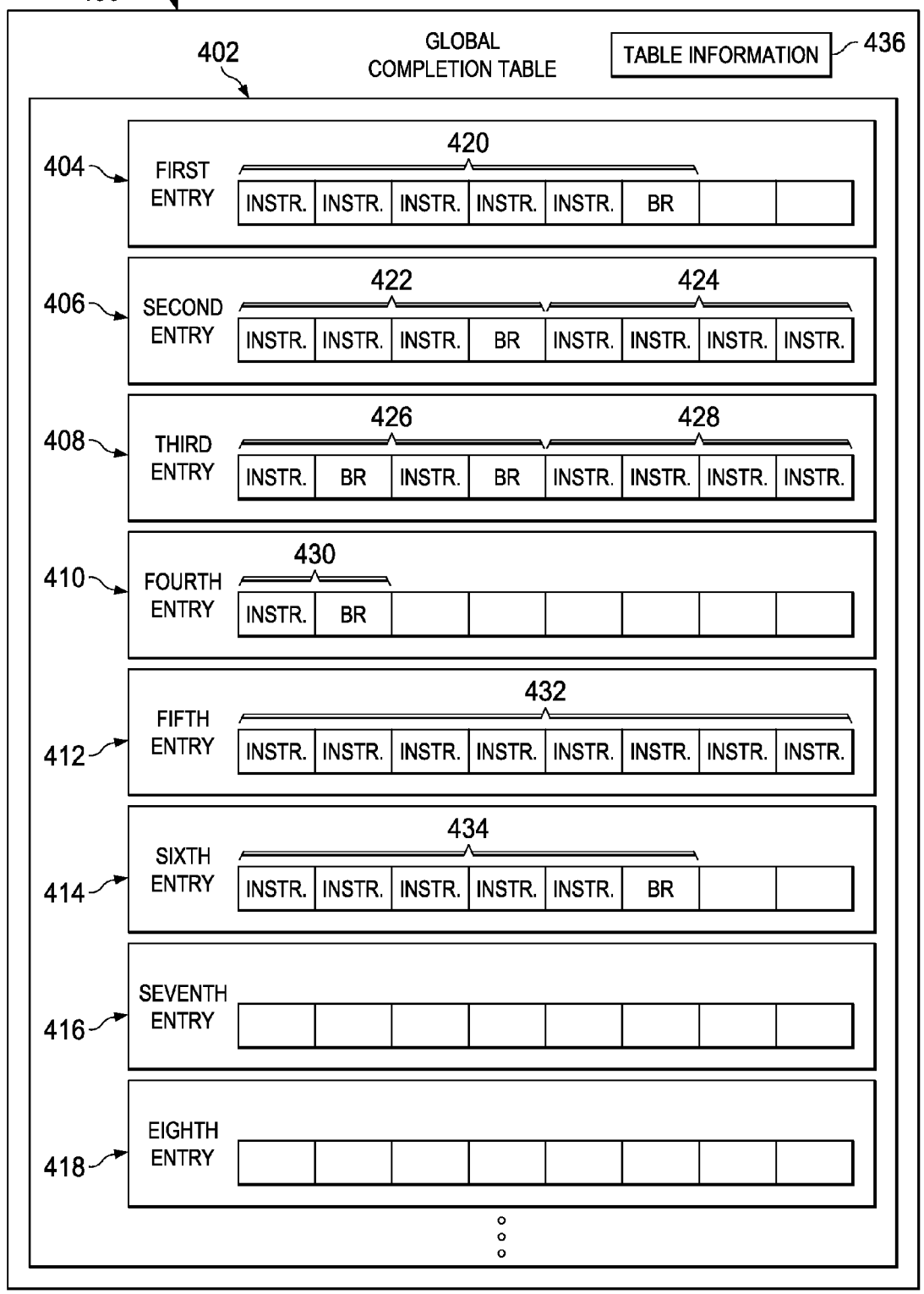
FIG. 4 is an illustration of a global completion table in accordance with an illustrative embodiment.

With reference now to FIG. 4, an illustration of a global completion table is depicted in accordance with an illustrative embodiment. In this illustrative example, global completion table 400 is an example of one implementation for global completion table 315 in FIG. 3. Further, entries 402 in global completion table 400 may be filled by completion logic 306 in FIG. 3.

As depicted, entries 402 include first entry 404, second entry 406, third entry 408, fourth entry 410, fifth entry 412, sixth entry 414, seventh entry 416, and eighth entry 418. Each entry in entries 402 is able to hold eight instructions, in this illustrative example. Instruction groups have been placed into entries within entries 402. Each of the instruction groups includes a number of instructions and a number of branch instructions.

First entry 404 includes instruction group 1 420. Second entry 406 includes instruction group 2 422 and instruction group 3 424. Third entry 408 includes instruction group 4 426 and instruction group 5 428. Fourth entry 410 includes instruction group 6 430. Fifth entry 412 includes instruction group 7 432. Sixth entry 414 includes instruction group 8 434. Instruction groups have not been placed into seventh entry 416 and eighth entry 418 of global completion table 400.

In this illustrative example, global completion table 400 also includes table information 436. Table information 436 may include information about the locations of instruction groups in global completion table 400, addresses for the instruction groups, pointers, thread identifiers, and/or other suitable information about the instruction groups. Table information 436 may also include information about which instructions in the instruction groups have been completed.

Figure 5:
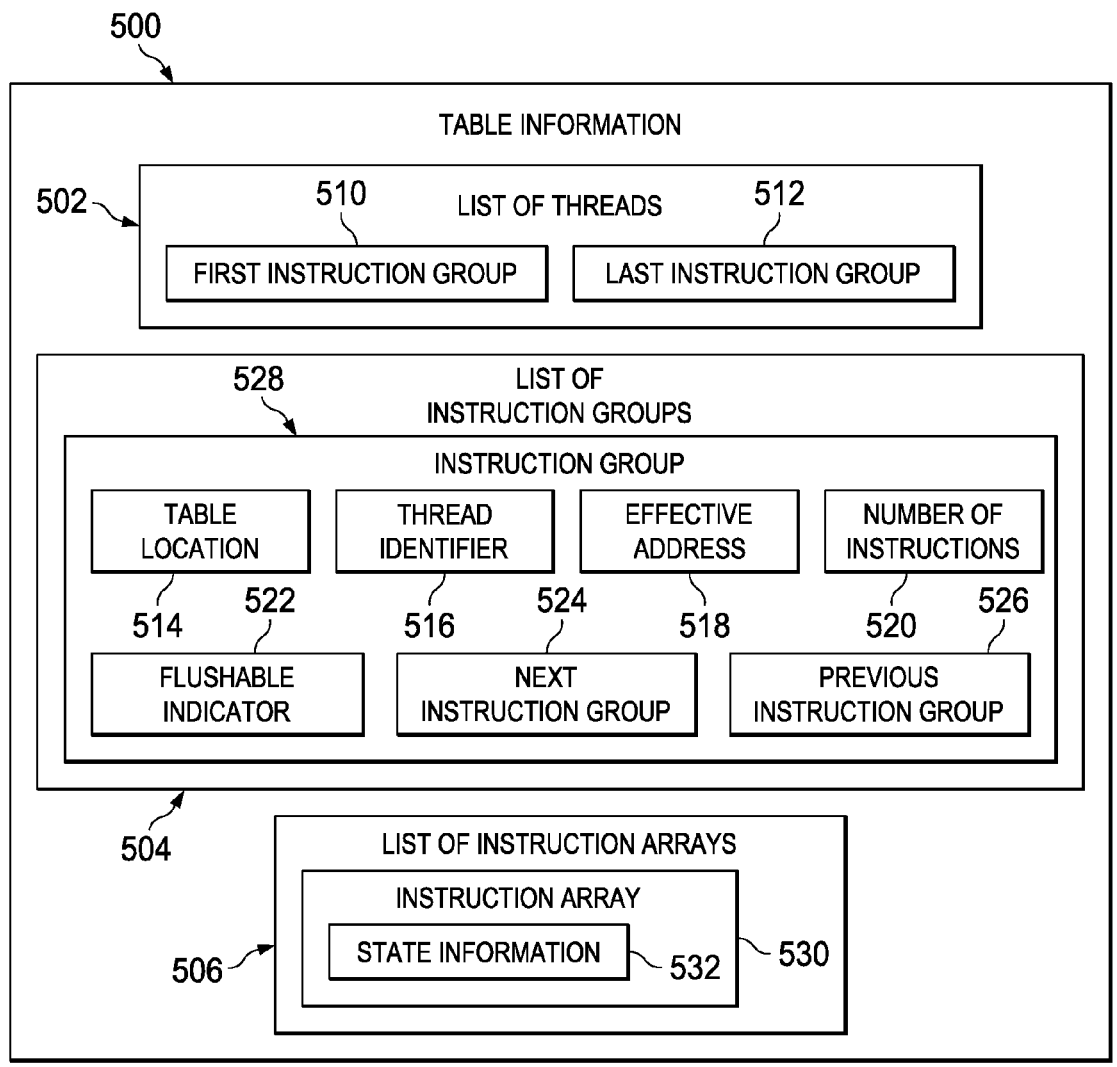
FIG. 5 is an illustration of table information in accordance with an illustrative embodiment.

With reference now to FIG. 5, an illustration of table information is depicted in accordance with an illustrative embodiment. In this illustrative example, table information 500 is an example of one implementation for table information 316 in FIG. 3 and/or table information 436 in FIG. 4.

As depicted, table information 500 includes list of threads 502, list of instruction groups 504, and list of instruction arrays 506. List of threads 502 includes a list of each thread that may be processed by completion unit 248 in FIG. 2 and/or completion unit 302 in FIG. 3. Further, list of threads 502 includes an identification of the first instruction group and last instruction group processed in a thread. For example, list of threads 502 identifies first instruction group 510 and last instruction group 512 for each thread in list of threads 502.

In this illustrative example, each thread in list of threads 502 is associated with a list of instruction groups in table information 500. For example, list of instruction groups 504 is a list of the instruction groups associated with a particular thread in list of threads 502. Further, list of instruction groups 504 identifies information about the instruction groups associated with the particular thread. For example, list of instruction groups 504 identifies table location 514, thread identifier 516, effective address 518, number of instructions 520, flushable indicator 522, next instruction group 524, and previous instruction group 526 for instruction group 528 in list of instruction groups 504.

Table location 514 identifies a location of the instruction group in the global completion table. Thread identifier 516 identifies the thread in list of threads 502 to which instruction group 528 belongs. Effective address 518 is the address for the first instruction in the instruction group. Number of instructions 520 indicates the number of instructions in the instruction group. In this illustrative example, the number of instructions includes both branch instructions and non-branch instructions.

Flushable indicator 522 indicates whether the instruction group may be flushed. An instruction group is flushed when the instruction group is discarded or removed from table information 500 and global completion table 400 in FIG. 4. For example, when a flow of processing instructions follows a path not predicted for a branch instruction, the instruction group or instruction groups following the predicted path after the branch instruction may be removed depending on the indication of flushable indicator 522.

In this illustrative example, next instruction group 524 identifies a location for the next instruction group following instruction group 528 in sequence. This location may be, for example, the address of the first instruction in the next instruction group or the location of the next instruction group in the global completion table.

Previous instruction group 526 identifies a location for the instruction group that is processed prior to instruction group 528 in sequence. This location may be, for example, the address of the first instruction in the previous instruction group or the location of the previous instruction group in the global completion table.

In this illustrative example, list of instruction arrays 506 is a list of arrays identifying state information for the instructions placed in an entry in the global completion table. For example, instruction array 530 is an instruction array in list of instruction arrays 506. Instruction array 530 corresponds to an entry in the global completion table. Each element in instruction array 530 identifies state information 532 for an instruction placed in the entry in the global completion table. Additionally, the elements within instruction array 530 identify state information 532 for instructions belonging to different instruction groups.

With reference now to FIG. 6, an illustration of table information is depicted in accordance with an illustrative embodiment. In this illustrative example, table information 600 is an example of one implementation for table information 316 in FIG. 3 and/or table information 500 in FIG. 5. More specifically, table information 600 is table information 436 in global completion table 400 in FIG. 4.

As depicted, table information 600 includes list of threads 602, list of instruction groups 604, and list of instruction arrays 606. In this illustrative example, list of threads 602 is an example of list of threads 502 in FIG. 5. List of threads 602 has columns including thread identifier 610, first instruction group 612, and last instruction group 614. Values for these columns are stored in memory.

List of threads 602 includes thread 1 616. Thread 1 616 has a first instruction group in a 1,1 table location and a last instruction group in a 6,1 table location. These locations correspond to entries in global completion table 400 in FIG. 4. For example, a 1,1 table location indicates that the first instruction group is in first entry 404 of global completion table 400 and is the first instruction group placed in first entry 404 in FIG. 4. A 6,1 table location indicates that the last instruction group is in sixth entry 414 of global completion table 400 and is the first instruction group placed in sixth entry 414 in FIG. 4.

In this illustrative example, list of instruction groups 604 is an example of list of instruction groups 504 in FIG. 5. List of instruction groups 604 has columns including table location 620, thread identifier 622, effective address 624, number of instructions 626, flushable indicator 628, next instruction group 630, and previous instruction group 632. Values for these columns may be stored in memory.

As depicted, list of instruction groups 604 includes instruction group 1 634, instruction group 2 636, instruction group 3 638, instruction group 4 640, instruction group 5 642, instruction group 6 644, instruction group 7 646, and instruction group 8 648. In this illustrative example, each of these instruction groups belongs to thread 1 616. Further, each of these instruction groups correspond to instruction groups placed in entries 402 in global completion table 400 in FIG. 4. Additionally, based on the table locations of these instruction groups, instruction group 1 634 is the first instruction group in thread 1 616 and instruction group 8 648 is the last instruction group in thread 1 616.

In this illustrative example, next instruction group 630 identifies the table location of the next instruction group in sequence. For example, for instruction group 1 634, the next instruction group has a 2,1 table location. In other words, the next instruction group in sequence after instruction group 1 634 is placed in second entry 406 of global completion table 400 and is the first instruction group placed in second entry 406 in FIG. 4. Previous instruction group 632 identifies the table location of the previous instruction group. In this illustrative example, a 0,0 table location is a null location. In other words, when next instruction group 630 or previous instruction group 632 identify a 0,0 table location, no next instruction group or no previous instruction group, respectively, is present.

List of instruction arrays 606 is an example of list of instruction arrays 506 in FIG. 5. Each instruction array in list of instruction arrays 606 corresponds to an entry in the global completion table. For example, instruction array 650 is an array of state information for the instructions within first entry 404 of global completion table 400 in FIG. 4. Each element in instruction array 650 corresponds to an instruction in first entry 404 in FIG. 4. A value of "1" for an element in the instruction array indicates that the instruction has finished. A value of "0" for an element in the instruction array indicates that the instruction has not been finished.

Additionally, instruction array 652 contains state information for the instructions in second entry 406 in FIG. 4. Instruction array 654 contains state information for the instructions in third entry 408 in FIG. 4. Instruction array 656 contains state information for the instructions in fourth entry 410 in FIG. 4. Instruction array 658 contains state information for the instructions in fifth entry 412 in FIG. 4. Instruction array 660 contains state information for the instructions in sixth entry 414 in FIG. 4. Instruction array 662 contains state information for the instructions in seventh entry 416 in FIG. 4. Instruction array 664 contains state information for the instructions in eighth entry 418 in FIG. 4.

In other illustrative examples, each of entries 402 in FIG. 4 may contain the instruction array associated with the entry in addition to instruction groups. For example, first entry 404 in FIG. 4 may include instruction array 652 in addition to instruction group 1 634.

Figure 7:
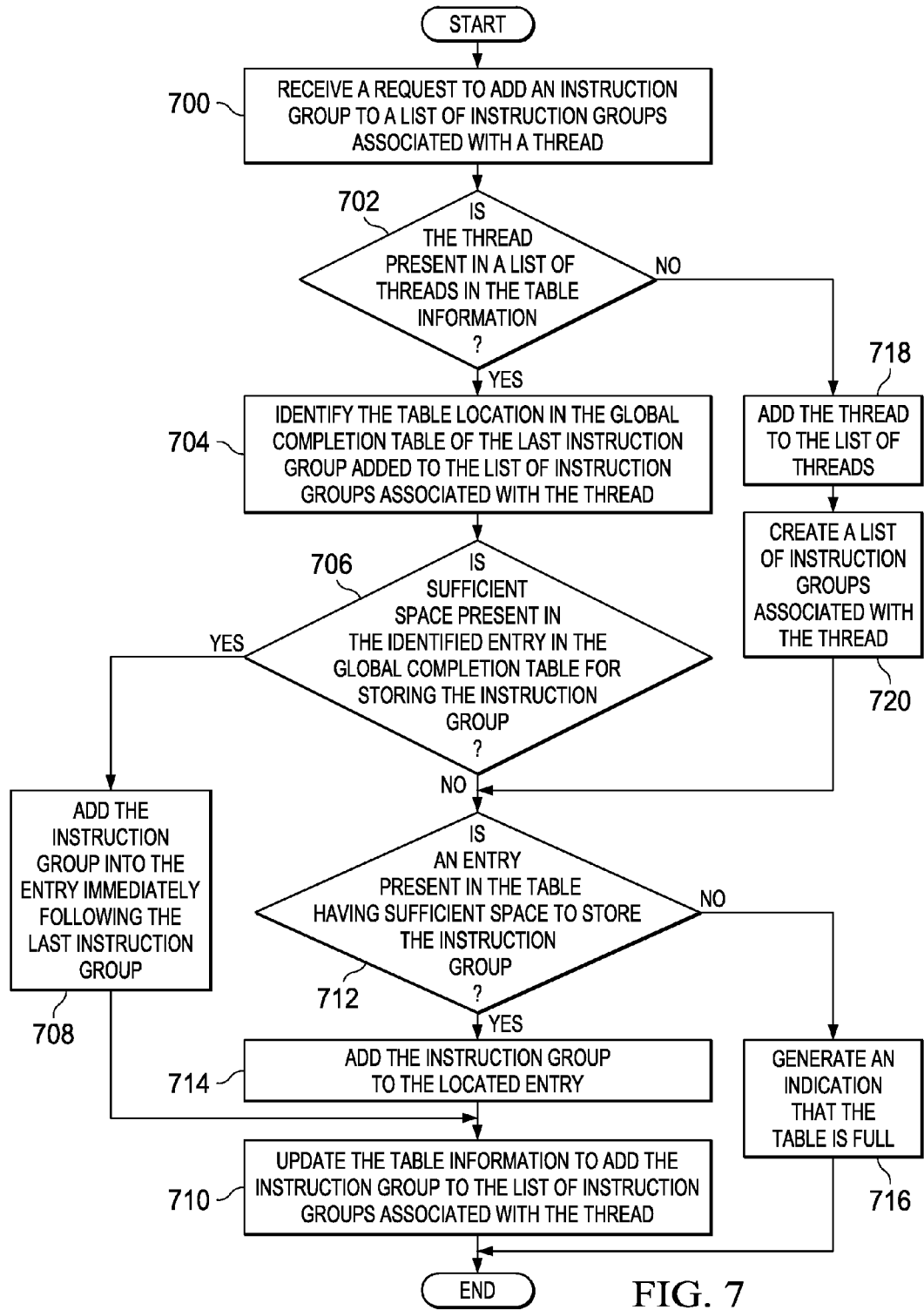
FIG. 7 is an illustration of a flowchart of a process for placing instruction groups into a global completion table in accordance with an illustrative embodiment.

With reference now to FIG. 7, an illustration of a flowchart of a process for placing instruction groups into a global completion table is depicted in accordance with an illustrative embodiment. The process illustrated in FIG. 7 may be implemented in completion unit 302 in FIG. 3. In particular, the different steps illustrated may be implemented in completion logic 306 in FIG. 3.

The process begins by receiving a request to add an instruction group to a list of instruction groups associated with a thread (step 700). In this step, the instruction groups are associated with the thread through the use of a thread identifier for a thread. This thread identifier may be provided by a sequencer, such as sequencer 310 in FIG. 3. Additionally, the request also may include an indicator as to whether the instruction group is flushable. An instruction group is flushable if it can be removed from processing. As one illustrative example, a request may be received to add instruction group 9 to list of instruction groups 604 associated with thread 1 616 in table information 600 in FIG. 6. Instruction group 9 may include 4 instructions.

A determination is made as to whether the thread is present in a list of threads in the table information (step 702). The table information may take the form of table information 500 in FIG. 5 and/or table information 600 in FIG. 6. If the thread is present in the list of threads in the table information, the process identifies the table location in the global completion table of the last instruction group added to the list of instruction groups associated with the thread (step 704). This identification includes an identification of the entry in the table in which the last instruction group was placed. For example, the process identifies the 6,1 table location for instruction group 8 648 in FIG. 6 and sixth entry 416 in FIG. 4.

Next, a determination is made as to whether sufficient space is present in the identified entry in the global completion table for storing the instruction group (step 706). If sufficient space is available to add the instruction group following the last instruction group in the entry, the process adds the instruction group into the entry immediately following the last instruction group (step 708). Thereafter, the process updates the table information to add the instruction group to the list of instruction groups associated with the thread (step 710), with the process terminating thereafter.

In step 710, the addition of the instruction group to the list of instruction groups associated with the thread in the table information also updates the identification of the last instruction group for the thread in the list of threads in the table information. For example, when instruction group 9 is added to list of instruction groups 604 associated with thread 1 616 in table information 600 in FIG. 6, the identification of the table location of last instruction group 614 is changed from the table location of instruction group 8 648 to the new table location of instruction group 9.

With reference again to step 706, if sufficient space is not present, the process determines whether an entry is present in the table having sufficient space to store the instruction group (step 712). For example, sixth entry 414 in FIG. 4 may not have sufficient space for instruction group 9. The process may locate fourth entry 410 as having sufficient space to store instruction group 9. If an entry is present in step 712, the process adds the instruction group to the located entry (step 714). In this illustrative example, instruction group 9 is added to fourth entry 410 as the second instruction group placed in fourth entry 410 in FIG. 4. After being added to fourth entry 410 in FIG. 4, instruction group 9 has a 4,2 table location. The process then continues to step 710 as described above.

In this illustrative example, when instruction group 9 is added to list of instruction groups 604, the identification of the location for next instruction group 630 for instruction group 8 648 in FIG. 6 is changed from a 0,0 table location to a 4,2 location.

In this illustrative example, when instruction group 9 is added to list of instruction groups 604, the identification of the location for previous instruction group 632 for instruction group 9 is set to the table location for instruction group 8 648 in FIG. 6, which is the 6,1 table location.

With reference again to step 712, if an entry is not present, the process generates an indication that the table is full (step 716), with the process terminating thereafter. In this case, no further entries can be added to the table until one or more instructions groups are completed or flushed.

With reference again to step 702, if the thread is not in a list of threads in the table information, the thread is added to the list of threads (step 718). Thereafter, the process creates a list of instruction groups associated with the thread (step 720). In this step, the list of instruction groups created is empty and does not include any instruction groups. The process then adds the instruction group to the list of instruction of instruction groups associated with the thread, with the process proceeding to step 712, as described above.

Figure 8:
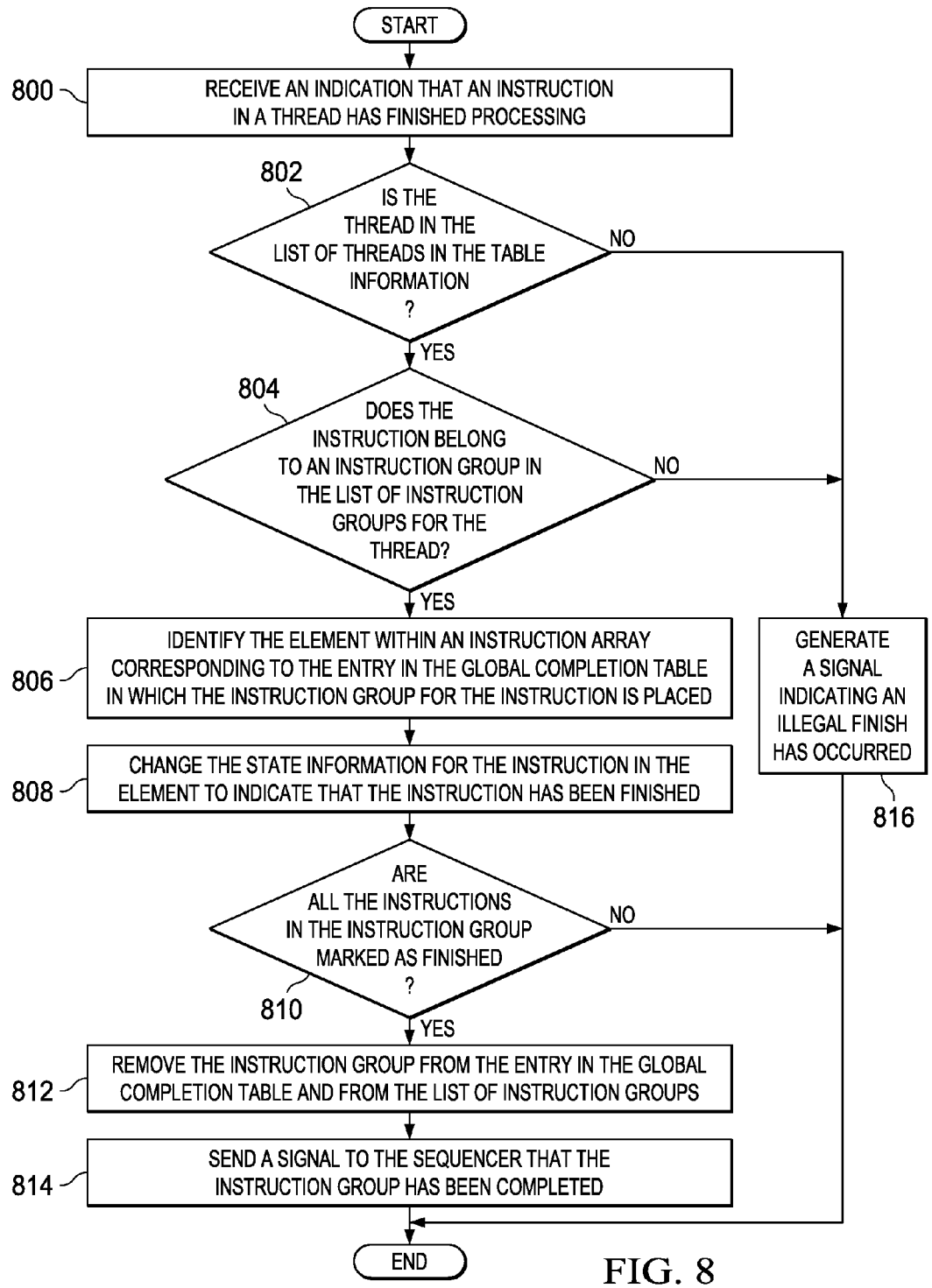
FIG. 8 is an illustration of a flowchart of a process for marking completed instructions in accordance with an illustrative embodiment.

Turning now to FIG. 8, an illustration of a flowchart of a process for marking finished instructions is depicted in accordance with an illustrative embodiment. The process illustrated in FIG. 8 may be implemented in completion unit 302 in FIG. 3, in these illustrative examples.

The process begins by receiving an indication that an instruction in a thread has finished processing (step 800). An instruction that has finished processing is an instruction that has been processed and is ready to be completed. However, an instruction is completed when all of the instructions in an instruction group are finished processing.

A determination is made as to whether the thread is in the list of threads in the table information (step 802). If the thread is found in the list of threads, a determination is made as to whether the instruction completed belongs to an instruction group in the list of instruction groups for the thread (step 804). If the instruction belongs to an instruction group in the list of instruction groups, the process identifies the element within an instruction array corresponding to the entry in the global completion table in which the instruction group for the instruction is placed (step 806).

The process then changes the state information for the instruction in the element to indicate that the instruction has been finished (step 808). For example, a value of "0" for the element in the instruction array corresponding to the instruction is changed to a value of "1".

Thereafter, the process determines whether all of the instructions in the instruction group have been marked as finished (step 810). If all of the instructions in the instruction group have been marked as finished, the process removes the instruction group from the entry in the global completion table and from the list of instruction groups (step 812). The process then sends a signal to the sequencer that the instruction group has been completed (step 814), with the process terminating thereafter. When the instruction group has been completed, the state information for the instruction group is set. Until completion of an instruction group, the instruction group and/or instructions in the instruction group can still be flushed. In this illustrative example, the sequencer may be, for example, sequencer 310 in FIG. 3 and/or sequencer unit 218 in FIG. 2.

With reference again to step 810, if all of the instructions have not been finished, the process terminates. With reference again to step 804, if the instruction is not in the list of instruction groups associated with the thread, the process generates a signal indicating an illegal finish has occurred (step 816), with the process terminating thereafter. With reference again to step 802, if the thread is not in the list of threads in the table information, the process proceeds to step 816 as described above.

Figure 9:
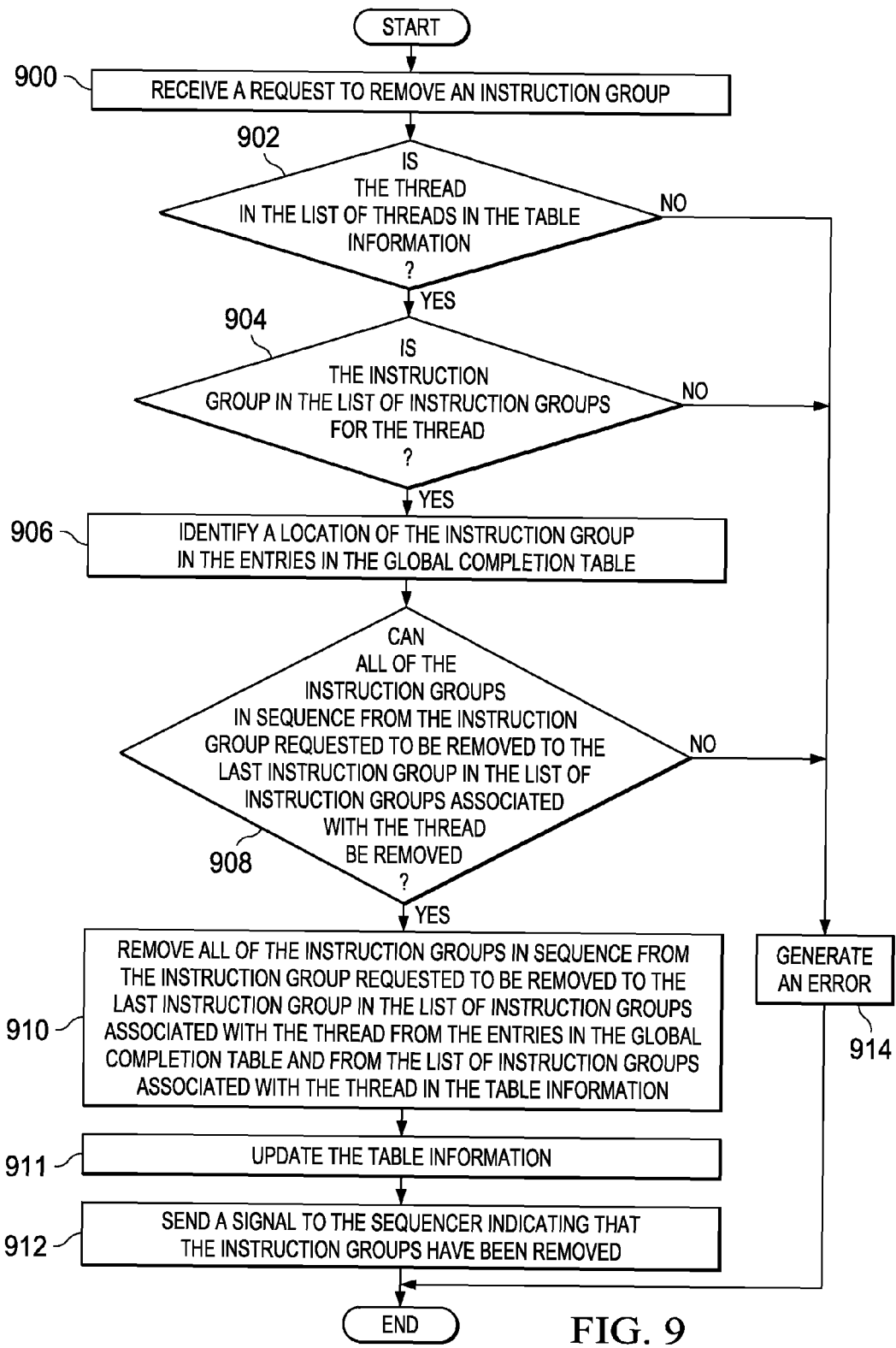
FIG. 9 is an illustration of a flowchart of a process for removing instruction groups in accordance with an illustrative embodiment.

Turning now to FIG. 9, an illustration of a flowchart of a process for removing instruction groups is depicted in accordance with an illustrative embodiment. The process illustrated in FIG. 9 may be implemented in completion unit 302 in FIG. 3.

The process begins by receiving a request to remove an instruction group (step 900). In step 900, the request is a flush request to flush an instruction group. As one illustrative example, the request may be a flush request to flush instruction group 6 644 in FIG. 6. Next, a determination is made as to whether the thread to which the instruction group belongs is in a list of threads in the table information (step 902). If the thread to which the instruction group belongs is in the list of threads, a determination is made as to whether the instruction group is in the list of instruction groups associated with the thread (step 904). If the instruction group is present in the list of instruction groups, the process identifies a location of the instruction group in the entries in the global completion table (step 906).

Next, the process determines whether all of the instruction groups in sequence from the instruction group requested to be removed to the last instruction group in the list of instruction groups associated with the thread can be removed (step 908). This determination may be made based on the flushable indicator associated with each instruction group in the list of instruction groups in the table information. For example, the process determines whether instruction group 7 646 and instruction group 8 648 in FIG. 6 can be removed when the instruction group requested to be removed is instruction group 6 646.

If all of the instruction groups can be removed, the process removes all of the instruction groups in sequence from the instruction group requested to be removed to the last instruction group in the list of instruction groups associated with the thread from the entries in the global completion table and from the list of instruction groups associated with the thread in the table information (step 910)

Thereafter, the process updates the table information (step 911). In step 911, the process also identifies the table location for the instruction group in sequence prior to instruction group 6 644 as indicated by previous instruction group 632 in FIG. 6. This instruction group, instruction group 5 642 is now the last instruction group for the thread and the table location for last instruction group 614 in FIG. 16 is updated to the table location for instruction group 5 642. Further, the table location indicated by next instruction group 630 for instruction group 5 642 is changed to a null table location of 0,0 in step 911.

Thereafter, the process sends a signal to the sequencer indicating that the instruction groups have been removed (step 912), with the process terminating thereafter.

With reference again to step 908, if all of the instruction groups in sequence from the instruction group requested to be removed to the last instruction group in the list of instruction groups cannot be removed, the process generates an error (step 914), with the process terminating thereafter. In step 914, the error is a flush request error.

With reference again to step 904, if the instruction group is not present in the list, the process proceeds to step 914 to generate a flush request error. The process also proceeds to step 914 from step 902 if the thread identified for the instruction group to be removed is not present in the list of the threads in the table information.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed or performed substantially concurrently, or the blocks may sometimes be processed or performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments provide a method and apparatus for tracking instructions. In particular, the different illustrative embodiments provide a method and apparatus for tracking the completion of instructions using a table in a processor. In response to receiving, by a completion unit in a processor, an instruction group for tracking, a first location in an entry in a table restoring instruction groups is identified. The completion unit stores the instruction group in the first location in the entry in the table identified for the instruction group to form a stored instruction group.

The completion unit associates a first set of pointers with the stored instruction group. The first set of pointers point to a previously stored instruction group in a second location in a second entry in the table. The previously stored instruction group is part of a same thread as the stored instruction group and is prior to the stored instruction group in an order of instructions for processing with the thread. The completion unit associates a second set of pointers with the prior instruction group. The second set of pointers point to the first location in the first entry for the stored instruction group.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction processing system. For the purposes of this description, a computer-usable or computer readable medium can be any tangible apparatus that can contain, store, communicate, propagate, or transport the program for use by or in connection with the instruction processing system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual processing of the program code, bulk storage, and cache memories which provide temporary storage of at least some program code in order to reduce the number of times code must be retrieved from bulk storage during processing of the program code.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for tracking instructions, in a processor, the method comprising:
   receiving, by a completion unit in the processor, an instruction group for a thread to add to a table to form a received instruction group;
   responsive to receiving, by the completion unit, the received instruction group, determining, by the completion unit, whether an entry is present that contains a previously stored instruction group in a first location and has space for storing the received instruction group;
   responsive to the entry being present, storing, by the completion unit, the received instruction group in a second location in the entry to form a stored instruction group;
   responsive to receiving, by the completion unit, the received instruction group, determining whether the space is available for the received instruction group in a particular entry containing a prior instruction group in which the prior instruction group is part of a same thread as the received instruction group and is immediately prior to the received instruction group in an order of instructions for processing for the thread; and
   responsive to the space being available in the particular entry, combining, by the completion unit, the received instruction group with the prior instruction group in the particular entry instead of performing the step of determining, by the completion unit, whether the entry is present that contains the previously stored instruction group and has the space for storing the received instruction group.

2. The method of claim 1 further comprising:
   associating, by the completion unit, a first set of pointers to the stored instruction group, wherein the first set of pointers points to a location in the table for a prior instruction group, wherein the prior instruction group is part of a same thread as the thread for the stored instruction group and is immediately prior to the stored instruction group in an order of instructions for processing for the thread; and
   associating, by the completion unit, a second set of pointers with the prior instruction group, wherein the second set of pointers points to the second location in the entry for the stored instruction group.

3. The method of claim 2, wherein the step of associating, by the completion unit, the first set of pointers with the stored instruction group comprises:
   storing the first set of pointers in table information in the table; and
wherein the step of associating, by the completion unit, the second set of pointers with the prior instruction group comprises:
   storing the second set of pointers in the table information in the table.

4. The method of claim 1 further comprising:
   responsive to receiving, by the completion unit, an indication that an instruction in the instruction group in the table has been completed, marking, by the completion unit, the instruction as being completed.

5. The method of claim 1 further comprising:
   receiving, by the completion unit, an identification of a selected instruction group for removal from the table; and
   responsive to receiving, by the completion unit, the identification of the selected instruction group, removing, by the completion unit, the selected instruction group from the table.

6. The method of claim 1 further comprising:
   receiving, by the completion unit, an identification of a selected instruction group for removal from the table;
   responsive to receiving, by the completion unit, the identification of the selected instruction group, determining, by the completion unit, whether the selected instruction group can be removed; and
   responsive to the selected instruction group not being able to be removed, generating an error.

7. The method of claim 6 further comprising:
   responsive to the selected instruction group being able to be removed, determining, by the completion unit, whether subsequent instruction groups are present for the thread after the selected instruction group; and
   responsive to the subsequent instruction groups being present for the thread after the selected instruction group, determining, by the completion unit, whether all of the subsequent instruction groups can be removed;
   responsive to the all of the subsequent instruction groups being able to be removed, removing, by the completion unit, the selected instruction group and the subsequent instruction groups from the table; and
   responsive to the all of the subsequent instruction groups not being able to be removed, generating the error.

8. The method of claim 7 further comprising:
   responsive to an absence of the subsequent instruction groups being present for the thread after the selected instruction group, removing, by the completion unit, the selected instruction group from the table.

9. The method of claim 1, wherein the instruction group is received by the completion unit from a sequencer in the processor.

10. A processor comprising:
   a table comprising a plurality of entries; and
   a completion logic configured to receive an instruction group for a thread to add to the table to form a received instruction group; determine whether an entry in the plurality of entries is present that contains a previously stored instruction group in a first location and has space for storing the received instruction group in response to receiving the instruction group; and store the received instruction group in a second location in the entry to form a stored instruction group in response to the entry being present, wherein the completion logic is further configured to determine whether the space is available for the received instruction group in a particular entry containing a prior instruction group in which the prior instruction group is part of a same thread as the received instruction group and is immediately prior to the stored instruction group in an order of instructions for processing for the thread in response to receiving the received instruction group; and combine the received instruction group with the prior instruction group in the particular entry in response to the space being available in the particular entry, instead of determining whether the previous entry is present in the plurality of entries that contains the previously stored instruction group in the first location and has the space for storing the received instruction group.

11. The processor of claim 10, wherein the completion logic is further configured to associate a first set of pointers to the stored instruction group, wherein the first set of pointers points to a location in the table for a prior instruction group, wherein the prior instruction group is part of a same thread as the thread for the stored instruction group and is immediately prior to the stored instruction group in an order of instructions for processing for the thread; and associate a second set of pointers with the prior instruction group, wherein the second set of pointers points to the second location in the entry for the stored instruction group.

12. The processor of claim 11, wherein in being configured to associate the first set of pointers with the stored instruction group, the completion logic is configured to store the first set of pointers in table information in the table; and wherein in being configured to associate the second set of pointers with the prior instruction group, the completion logic is configured to store the second set of pointers in the table information in the table.

13. The processor of claim 10, wherein the completion logic is further configured to mark an instruction in the instruction group in the table as being completed in response to receiving an indication that the instruction has been completed.

14. The processor of claim 10, wherein the completion logic is further configured to receive an identification of a selected instruction group for removal from the table; and remove the selected instruction group from the table in response to receiving the identification of the selected instruction group.

15. The processor of claim 10, wherein the completion logic is further configured to receive an identification of a selected instruction group for removal from the table; determine whether the selected instruction group can be removed in response to receiving the identification of the selected instruction group; and generate an error in response to the selected instruction group not being able to be removed.

16. The processor of claim 15, wherein the completion logic is further configured to determine whether subsequent instruction groups are present for the thread after the selected instruction group in response to the selected instruction group being able to be removed; determine whether all of the subsequent instruction groups can be removed in response to the subsequent instruction groups being present for the thread after the selected instruction group; remove the selected instruction group and the subsequent instruction groups from the table in response to the selected instruction group and the subsequent instruction groups being able to be removed; and generate an error in response to the all of the subsequent instruction groups not being able to be removed.

17. The processor of claim 16, wherein the completion logic is further configured to remove the selected instruction group from the table in response to an absence of the subsequent instruction groups being present for the thread after the selected instruction group.

18. A data processing system comprising:
   a bus system;
   a memory connected to the bus system;
   a processor unit connected to the bus system;
   a table comprising a plurality of entries in the processor unit; and
   a completion logic in the processor unit, wherein the completion logic is configured to receive an instruction group for a thread to add to the table to form a received instruction group; determine whether an entry in the plurality of entries is present that contains a previously stored instruction group in a first location and has space for storing the received instruction group in response to receiving the instruction group; and store the received instruction group in a second location in the entry to form a stored instruction group in response to the entry being present, wherein the completion logic is further configured to determine whether the space is available for the received instruction group in a particular entry containing a prior instruction group in which the prior instruction group is part of a same thread as the received instruction group and is immediately prior to the stored instruction group in an order of instructions for processing for the thread in response to receiving the received instruction group; and combine the received instruction group with the prior instruction group in the particular entry in response to the space being available in the particular entry, instead of determining whether the previous entry is present in the plurality of entries that contains the previously stored instruction group in the first location and has the space for storing the received instruction group.

19. The data processing system of claim 18, wherein the completion logic is further configured to associate a first set of pointers to the stored instruction group, wherein the first set of pointers points to a location in the table for a prior instruction group, wherein the prior instruction group is part of a same thread as the thread for the stored instruction group and is immediately prior to the stored instruction group in an order of instructions for processing for the thread; and associate a second set of pointers with the prior instruction group, wherein the second set of pointers points to the second location in the entry for the stored instruction group.

20. The data processing system of claim 18, wherein the completion logic is further configured to mark an instruction in the instruction group in the table as being completed in response to receiving an indication that the instruction has been completed.

21. The data processing system of claim 18, wherein the completion logic is further configured to receive an identification of a selected instruction group for removal from the table; and remove the selected instruction group from the table in response to receiving the identification of the selected instruction group.

22. The data processing system of claim 18, wherein the completion logic is further configured to receive an identification of a selected instruction group for removal from the table; determine whether the selected instruction group can be removed in response to receiving the identification of the selected instruction group; and generate an error in response to the selected instruction group not being able to be removed.

* * * * *